(12) United States Patent
Holder et al.

(10) Patent No.: US 7,789,547 B2
(45) Date of Patent: Sep. 7, 2010

(54) LED-FIBER OPTIC COMBINATION FOR SIMULATING NEON LIT SIGNAGE

(75) Inventors: Ronald G. Holder, Laguna Niguel, CA (US); Greg Rhoads, Irvine, CA (US)

(73) Assignee: Cooper Technologies Company, Houston, TX (US)

( * ) Notice: Subject to any disclaimer, the term of this patent is extended or adjusted under 35 U.S.C. 154(b) by 257 days.

(21) Appl. No.: 12/067,147

(22) PCT Filed: Sep. 26, 2006

(86) PCT No.: PCT/US2006/037786
§ 371 (c)(1),
(2), (4) Date: Apr. 11, 2008

(87) PCT Pub. No.: WO2007/038652
PCT Pub. Date: Apr. 5, 2007

(65) Prior Publication Data
US 2008/0259631 A1 Oct. 23, 2008

Related U.S. Application Data

(60) Provisional application No. 60/721,751, filed on Sep. 28, 2005.

(51) Int. Cl.
*F21V 17/00* (2006.01)
(52) U.S. Cl. .................. 362/581; 362/559; 385/136
(58) Field of Classification Search .............. 362/46, 362/147, 151, 152, 208, 396, 457, 485, 487, 362/488, 551, 555, 556, 559, 560, 576, 581, 362/582, 812; 385/31, 32, 123, 125, 136, 385/141, 146, 147, 901; 40/547; 248/49, 248/65, 68.1, 157, 159, 230.9
See application file for complete search history.

(56) References Cited

U.S. PATENT DOCUMENTS

| 3,497,981 | A | | 3/1970 | Tyne |
| 4,279,465 | A | * | 7/1981 | Vojvodich ............... 385/88 |
| 4,898,542 | A | * | 2/1990 | Jones, Jr. ............... 439/371 |
| 5,495,400 | A | * | 2/1996 | Currie .................. 362/551 |
| 5,537,297 | A | | 7/1996 | Ghandehari |
| 5,675,128 | A | * | 10/1997 | Simon ................ 174/152 G |

(Continued)

FOREIGN PATENT DOCUMENTS

DE      2362930 A  *  8/1974

OTHER PUBLICATIONS

International Searching Authority, The International Search Report and the Written Opinion for PCT/US06/37786 dated Mar. 23, 2007, 11 pages.

*Primary Examiner*—Hargobind S Sawhney
(74) *Attorney, Agent, or Firm*—Daniel L. Dawes; Marcus C. Dawes

(57) ABSTRACT

An improvement in LED lighting simulative of neon lighting comprises a light cable (3). A clamp (2) coupled to the cable (3) holds an end of the cable (3) in a predetermined bend, and an LED (14) is optically coupled to the cable (3). A support (11) is coupled to the clamp and includes a surface (34) adjacent to the cable (3) to reflect light incident on its surface, which is a diffuse reflector. A clip (4) retains the cable (3) on the support (11). The clamp (2) is at least partially opaque and shields an end of the cable (3) to simulate a neon tube. The LED light source (14) comprises a housing (12) to which the clamp (2) is coupled, and comprises an LED emitter and a reflector. The clamp (2) is mounted on a substrate (21) and at least one additional sign element mounted to the substrate, such as an LED backlit sign element.

18 Claims, 3 Drawing Sheets

U.S. PATENT DOCUMENTS

| | | |
|---|---|---|
| 5,678,914 A | 10/1997 | Ealey et al. |
| 5,799,124 A | 8/1998 | Zorn et al. |
| 6,049,040 A * | 4/2000 | Biles et al. .................. 174/68.3 |
| 6,065,852 A * | 5/2000 | Crumley ...................... 362/146 |
| 6,104,857 A | 8/2000 | Ishiharada et al. |
| 6,123,442 A | 9/2000 | Freier et al. |
| 6,328,459 B1 | 12/2001 | Adams |
| 6,594,417 B1 | 7/2003 | Hulse |
| 6,885,805 B2 * | 4/2005 | Asada ......................... 385/134 |
| 7,213,934 B2 * | 5/2007 | Zarian et al. ................. 362/101 |
| 2003/0063888 A1 * | 4/2003 | Sahlin et al. ................. 385/134 |
| 2005/0084229 A1 * | 4/2005 | Babbitt et al. ................ 385/146 |

* cited by examiner

LED-FIBER OPTIC COMBINATION FOR SIMULATING NEON LIT SIGNAGE

RELATED APPLICATIONS

The present application is related to U.S. Provisional Patent Application Ser. No. 60/721,751, filed on Sep. 28, 2005, which is incorporated herein by reference and to which priority is claimed pursuant to 35 USC 119.

BACKGROUND OF THE INVENTION

1. Field of the Invention

The invention relates to the field of light emitting diodes LED) and fiber optic lighting systems and in particular to a system which simulates neon lights or signage.

2. Description of the Prior Art

There have been many attempts to simulate neon with LEDs. Most of the solutions comprise a string of small LEDs closely spaced. The LEDs are encapsulated or covered with a diffusing material or lens. The resultant line of light generated by the LEDs appears to be continuous. One serious drawback of this type of device is that individual LEDs have widely varying life degradation curves. After a short period of time, the uniformity in output is no longer within a desirable range. A visible example of this phenomenon is the LED street signal lamps that are a few years old. They have many LEDs that are 'out' or very dim and they no longer look uniformly illuminated.

Another drawback of a device comprised of many LEDs in a closely spaced line is that due to the difficult manufacturing process of LEDs, they vary considerably in wavelength and intensity even when new. Close attention to binning the LEDs is required at time of device manufacture.

Yet another drawback of devices of this type is that most are rigid and cannot be bent to form letters or graphic lines. The few devices that can be bent have a backbone that fills the gap between the lighted portion and the base, eliminating the 'open look' of a neon sign.

Several fiber optic illuminators based on LEDs have also been manufactured. These devices incorporate one or more LEDs configured to shine into the end of a fiber. These devices are too bulky when placed at the end of a fiber to give the look and feel of a traditional bent neon tube.

BRIEF SUMMARY OF THE INVENTION

The illustrated embodiment of the invention is directed to an apparatus and method for using light emitting diodes LED) and fiber optic material or light pipes in a system to allow the combination to have the look and feel of neon lighting. The device could be used in general lighting, decorative and architectural lighting, signage and many other applications. A device of the invention provides a similar look and feel of neon without the negatives of current neon lighting.

Neon lighting is fragile. It is comprised of a glass tube with a gas sealed inside, an igniter and a transformer. Failure can occur either by breakage or leakage of the gases). LEDs by contrast are not fragile and neither are most large core plastic fiber optic materials. By combining these two sturdy elements with an appropriate delivery system, a device can be made that has the look and feel of neon without its fragility.

A preferred device of the invention is comprised of an LED fiber engine placed near at least one end of a optical fiber, optic cable, light cable or light pipe. These terms will be used interchangeably in the present disclosure. The fiber optic cable could be of most any manufactured type, but a preferred fiber cable would have a 360° light emission pattern like a neon gas tube. The device further has a clamping system for the fiber end that holds the fiber in position over the LED light source and provides a 90° bend for the end of the fiber. Since most fiber optic cables have a jacket over a core, the clamp secures the end and controls the bend radius of the fiber to ensure it does not kink or bend further than its preferred minimum bending radius. A minimum bending radius is the smallest radius which is recommended for a fiber without substantially reducing light conduction down the fiber. The minimum bending radius will differ for each different size and composition of the fiber, is usually specified by the fiber manufacturer or can be empirically determined. A proper cut in the clamp rounds off the exposed portion of the fiber near its end to make the fiber appear to have the radius of a neon tube end.

Optionally, the clamp provides end clamping for an optic fiber support that is bent or cut into a desired shape for the system. In the illustrated embodiment the clamp is fabricated from an opaque material, such as black plastic and gives a similar visual appearance at a distance of the black coating traditionally provided on the ends of conventional neon tubing. The support is preferably composed of plastic, extruded or cut aluminum or any other appropriate material. The support may be coated its side facing the fiber with a diffuse, white or a reflective surface. Because the fiber optic is stiff and resists bending, a means is provided, such as clips or adhesives that attaches the fiber optic fiber to the support. By putting multiple systems of devices of the invention together a sign or decoration of nearly unlimited complexity can be manufactured.

A device of the invention exhibits a glow of light appearing like a neon tube. The 'tube' is suspended much like a neon tube above a base. It also has rounded ends much like a neon tube would when bent back around on itself like a conventional neon installation. The tubes of neon signs are most often 'blacked' out on the backside, and a device of the invention maintains an appearance which closely simulates.

More particularly, the illustrated embodiment is an improvement in a lit sign or LED lighting simulative of neon lighting comprising a light cable, a clamp coupled to the light cable for holding at least an end portion of the light cable in a predetermined bend, and a light source optically coupled to the light cable, such as an LED light source.

The clamp holds the light cable in a bend with a radius equal to or greater than the minimum radius of bend permitted for the light cable. The improvement further comprises a substrate. The clamp is coupled to the substrate and supports the light cable above the substrate. In some embodiments at least one additional sign element is mounted to the substrate, such as an LED backlit sign element.

The improvement further comprises a light cable support coupled to the clamp for supporting the light cable. The support preferably includes a surface adjacent to the light cable to reflect light incident on the surface, such as a surface which is a diffuse reflector.

The improvement further comprises a clip to retain the light cable onto the support. The clip is adapted to restrain movement of the light cable with respect to the support in all directions. Other embodiments of the clip are adapted to restrain movement of the light cable with respect to the support in only one direction.

In one embodiment the clamp is adapted to bend the light cable through an angle of up to 90°, but could also be adapted to bend the light cable through an angle of more than 90° or through an angle of up to 180°. The clamp is at least partially opaque and light shields an end portion of the light cable to simulate a neon tube.

In the illustrated embodiment the clamp comprises two clamp halves and a reinforcing flange to provide strength and assist in defining a radius of bend of the clamp.

The light source comprises a housing to which the clamp is coupled, and is illustrated as including an LED emitter and a reflector. The preferred embodiment employs a low voltage, low heat, solid state light source, but the light source, however, is not limited to LEDs, but may include any type of light source now known or later devised, e.g. any type of light source having point or localized ariel source of light adapted to be coupled into the end of a light cable could be substituted, including incandescent or plasma light sources.

The invention is further characterized as a method of simulating a neon sign comprising the steps of providing a cylindrical light cable, mounting the light cable by means of a clamp holding at least an end portion of the light cable in a predetermined bend; and lighting the light cable through its end held by the clamp by means of a light source optically coupled to the light cable.

The method further comprises the step of diffusely reflecting light from the back portion of the light cable by means of an elongate support underlying the light cable having a diffusely reflecting surface oriented toward the back portion of the light cable.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

Figure 1:
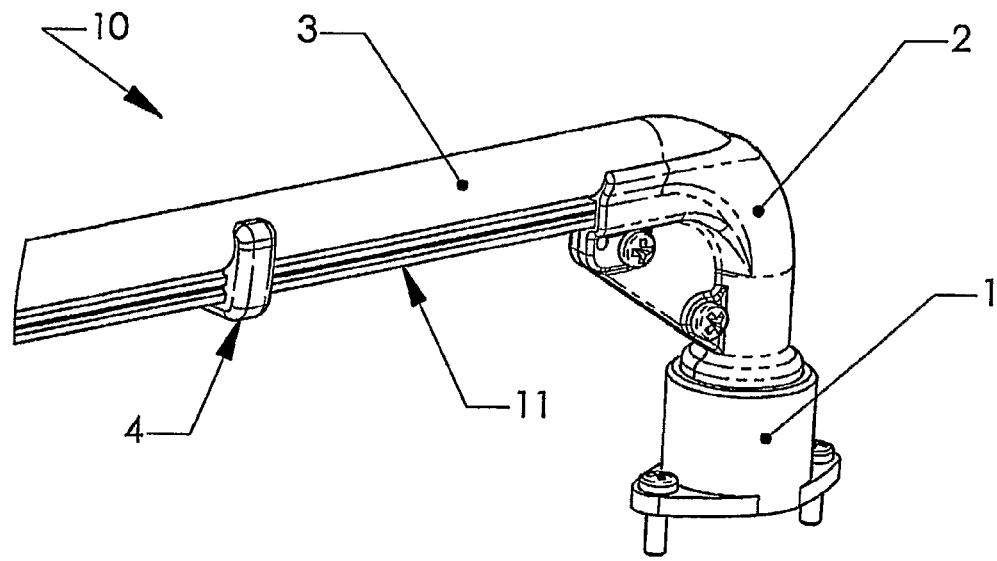
FIG. 1 is a perspective view of one end of a fiber optic and its associated clamp as used in the basic system of a preferred embodiment of the invention.

FIG. 1 is a perspective view of the illustrated embodiment 10 of the invention which is comprised of clamp 2 coupled to fiber optic cable 3 and mounted on a light engine 1. Light engine 1 includes a selectively chosen colored LED light source 14 best shown in the side cross sectional view of FIG. 5. Light engine 1 is positioned in the proximity of the end of fiber optic cable 3 by means of clamp 2, so that the LED light source 14 within engine 1 is optically coupled to cable 3 as shown in greater detail in connection with FIG. 5. Thus, it is to be understood that the physical configuration of engine 1 with respect to cable 3 can assume any form now known or later devised through which effective optical coupling into cable 3 is obtained. Further, although the light pipe or optic fiber has been described as a cable 3, it is also to be understood that any elongate means which is able to conduct light may be substituted, regardless of composition or size. For example, cable 3 in the illustrated embodiment is a flexible or semi-flexible 0.4 inch diameter fiber optic cable, such as manufactured by Poly Optics of Mudgeeraba, Queensland, Australia. However, it is expressly contemplated that optic fibers of smaller diameters and obtained from other sources could be equivalently substituted.

In the preferred embodiment, cable 3 has a size simulative of the diameters used in conventional neon signs, has a low internal longitudinal transmission loss, and a uniform transverse diffusion coefficient, so that cable 3 appears to "light up" or to uniformly transmit light at angles transverse to the longitudinal axis of cable 3 into the viewer's eyes.

Figure 2:
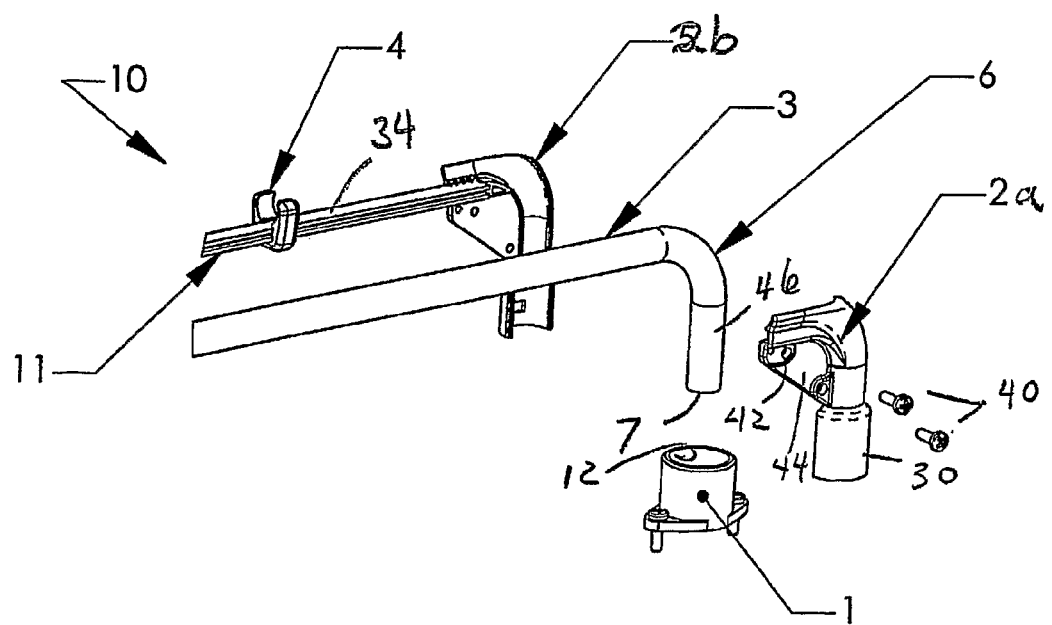
FIG. 2 is a partially exploded perspective view of the embodiment of FIG. 1.
Figure 4:
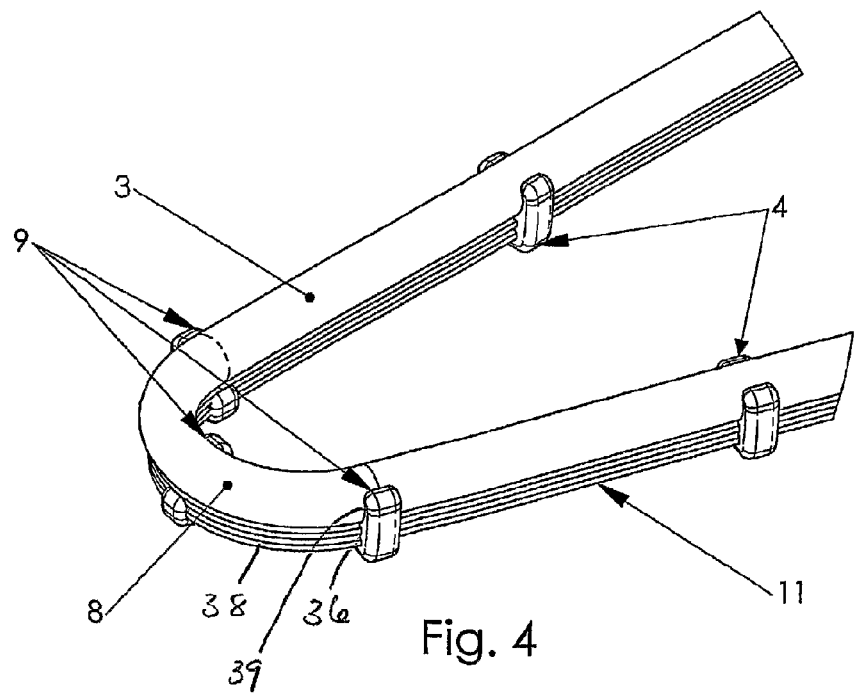
FIG. 4 is a perspective view of a bend in the fiber optic as used in an embodiment of the invention whereby the fiber optic cable is bent to form a shape in a plane parallel to a mounting surface.

In a preferred embodiment of the invention the fiber optic cable 3 is held in place by a support 11 and clips 4, which are also coupled to support 11. The support 11 is an elongate member, which may be a plastic or metal extrusion, molding or other type of fabrication and may be of any appropriate cross section of surface 34 adjacent to cable 3 as shown in FIG. 2. Surface 34 may be flat or may conform to the opposing cylindrical surface of cable 3. Support 11 may be bent, cut, molded or otherwise shaped by the user to any shape consistent with the mechanical and optical properties of the fiber optic cable 3 and the design of the system. Support 11 is thus mechanically laterally deformable or heat deformable to allow the user to freely shape its two dimensional layout. The clips 4 can be of any shape required to attach the fiber optic cable 3 to the support 11. As best shown in FIG. 4 clip 4 is made of resilient material and has a U-shape with matching multiple internal ridges 36 to mate with corresponding multiple grooves 38 defined in the side surfaces of support 11 and an internal conforming surface 39 in the upper portion of the arms of the U-shape to clasp cable 3. Clips 4 can thus be mechanically snapped into and out of engagement with cable 3 and support 11 as well as being longitudinal slid along the length of cable 3 and support 11. However, the resilient clasping is sufficient so that the position of clip 4 remains fixed under normal circumstances once put into place.

For long runs of fiber optic cable 3 and support 11, a means (not shown) or fixture to attach the support 11 to a back panel or support structure is provided, such as conventional pedestal mounts or standoffs. The surface 34 of support 11 which is adjacent to cable 3 may be inherently reflective, coated with a reflective surface, may be specular or may be provided with a light diffusing surface. In the illustrated embodiment, the adjacent surface 34 of support 11 is colored white so that light transmitted from cable 3 onto the surface 34 is reflected back through cable 3, and ultimately to a viewer to serve to provide cable 3 with a color opaque appearance. In other words, instead of having cable 3 acting as a lens to image a portion of the substrate on which the sign as a whole is mounted or to illuminate underlying portions of the substrate, the reflective surface 34 of support 11 reflects the transmitted light and sets off cable 3 more singularly with respect to its background as glowing the color of light transmitted from light engine 1 into cable 3.

FIG. 2 is an exploded perspective view of FIG. 1 which shows the fiber optic cable 3 as having a bend 6 of approximately 90 degrees near its end 7. This bend 6 is held by the clamp halves 2a and 2b. The bend 6 is preferably designed at or near the minimum recommended radius for the fiber optic cable 3. The clamp halves 2a and 2b could be split in any direction or plane. The clamp halves 2a and 2b may be provided with snaps, fasteners or glued together or any combined in any appropriate means to provide attachment to cable 3. In FIG. 2 clamp halves 2a and 2b are shown as fastened together by screws 40 disposed through holes 42 in flange 44, which also serves as a mechanically reinforcing web for clamp halves 2a and 2b. The basal section 30 of clamp halves 2a and 2b interface with or fit into the cylindrical housing 12 of fiber engine 1. Housing 12 of fiber engine 1 provides an alignment and attachment means to clamp 2.

Figure 3:
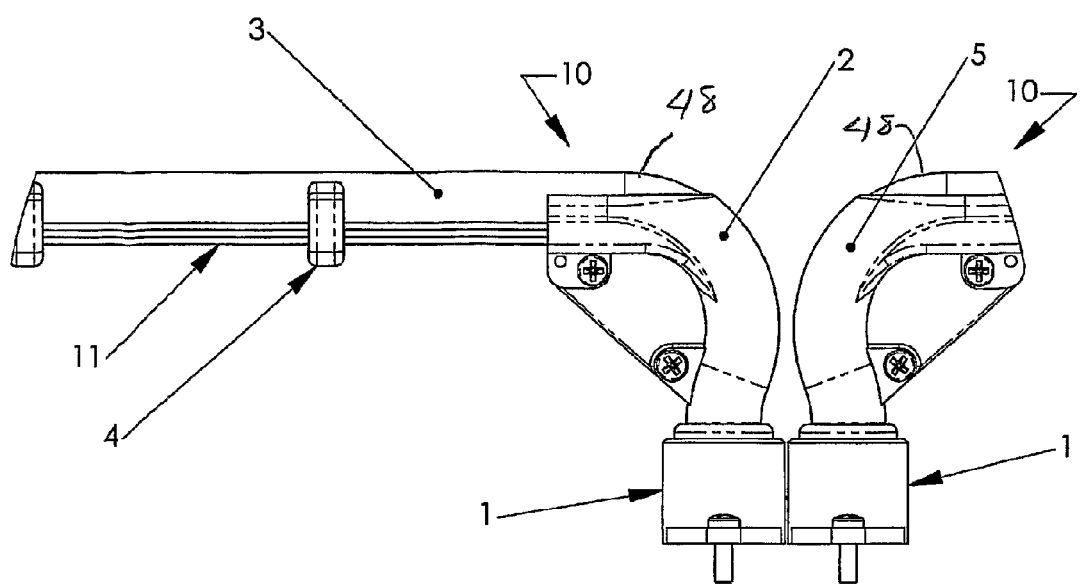
FIG. 3 is a side elevational view of two adjacent clamps and the fiber optic ends of an alternate embodiment of the invention. The two clamps are shown opposing each other end to end. This view shows the 'jog' in the clamp to allow the lit fiber ends to appear closer together.

FIG. 3 shows an alternate embodiment of clamp halves 2a and 2b of the invention. By 'jogging' the fiber optic cable 3 and the fiber engine assemblies 1, as shown in FIG. 3 a user can get the lit up upper end portions 48 of two opposing cables 3 closer together than if the ends 46 of cables 3 were maintained in a straight configuration as shown in FIG. 2. FIG. 3 shows one embodiment of the invention, where the bend radii and angles could be varied even more than that shown in the drawing so that the fiber optic cable ends 46 could undergo a full 180 degree bend if desired.

FIG. 4 is a perspective view which shows the fiber optic cable 3 and support 11 held together around a sharp corner by clips 4 and 9. Clips 4 wrap around the fiber optic cable 3 and support 11 in such a way as to control the position of fiber optic cable 3 in all directions. In other words the U-shaped arms of clips 4 extend equally up both sides of cable 3. Clips 9 are differently shaped in order to be used on the inside or outside only of a curved section of support 11 to prevent the fiber cable 3 from moving in a selected direction. As shown in FIG. 4 clips 9 have one shortened arm of the U-shape, which can be oriented either on the inside or outside of the curve of cable 3. Either form may be used as well as other means to control the position and shape of fiber optic cable 3 along the support 11.

Figure 5:
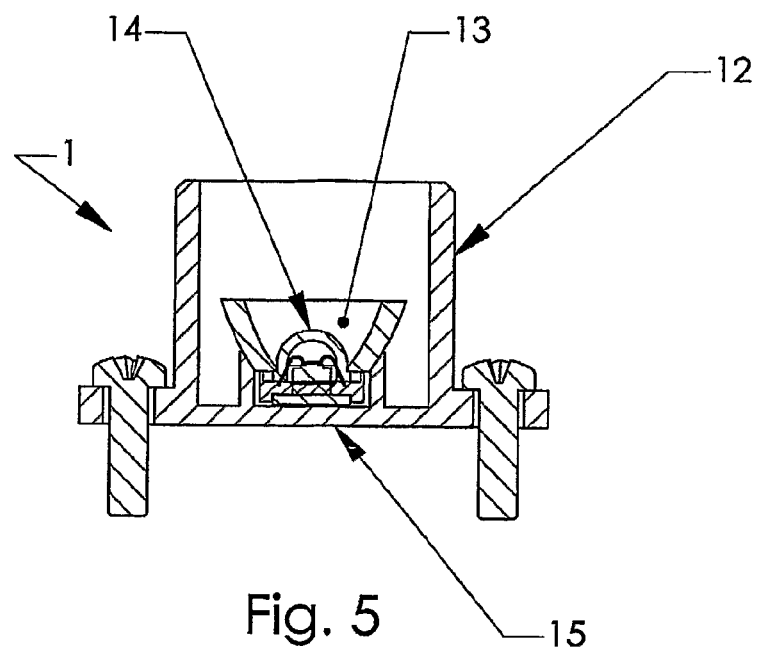
FIG. 5 is a perpendicular side cross sectional view of the LED light engine used in the base of the clamp shown in FIGS. 1-3.

FIG. 5 is a side cross-sectional view of the light engine 1 of a preferred embodiment of the invention and is comprised of an LED source 14, a reflector or collection optic 13, a housing 12 with a means of aligning and attaching to the fiber optic cable 3 and clamp 2 and a thermal heat sink 15 that provides heat sinking for the LED source 14 and can be optionally attached to additional surfaces for heat dissipation. LED source 14 may include any type of LED light source now known or later devised and specifically contemplates the inclusion of additional or different reflectors, optical lenses, filters or optical or packaging elements and multiple emitters. For example, in addition to various optical elements being included in LED light source 14, additional electronic sources may be included either into engine 1 or coupled thereto. It is to be understood that LED source 14 is coupled in a conventional manner to a conventional LED driver and power source (not shown). Conventional electronic modulators could also be included in circuit so that a time varying light pattern, color variations and/or modulated light generation are provided, e.g. a sign whose color or intensity is modulated by ambient sound or electrical connection to a sound system.

Figure 6:
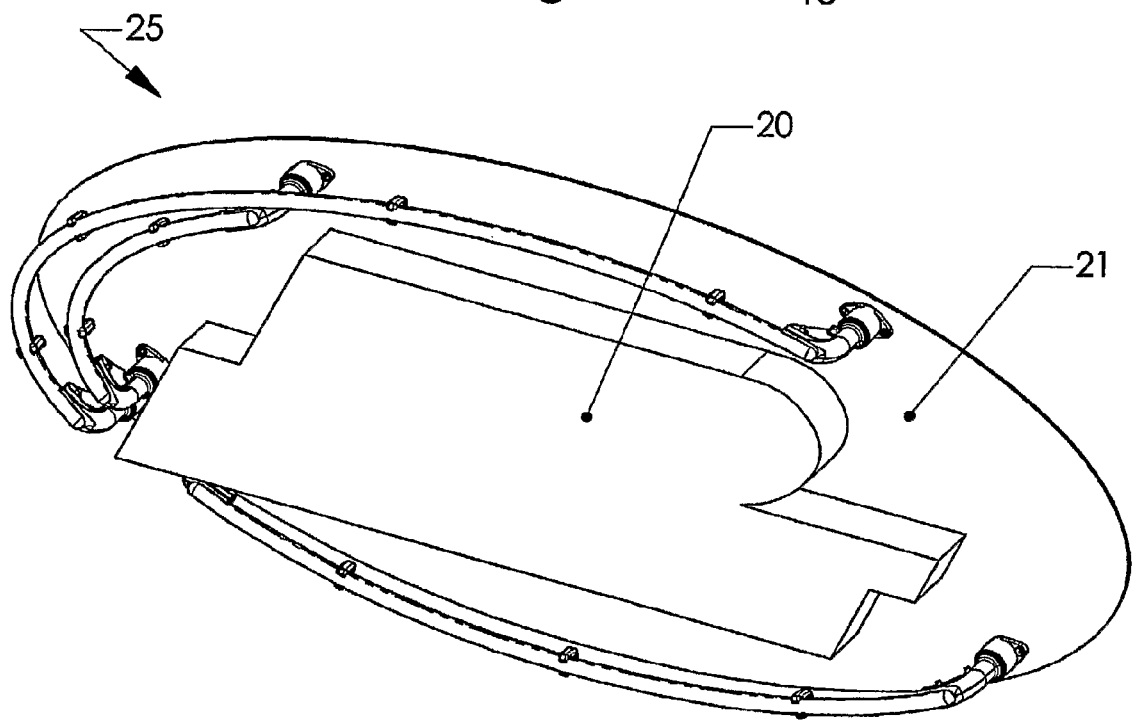
FIG. 6 is a perspective view of an illustrative embodiment of a sign, provided according to FIGS. 1-5 which is simulative of a conventional neon sign in appearance.

FIG. 6 is a perspective view of an assembled sign 25 incorporating the invention mounted on back panel or substrate 21 which doubles as a heat sink to which fiber engines 1 attach or are thermally coupled. The panel 21 is shown as a solid piece, however it is anticipated that individual or groups of subsystems could be assembled with or without discrete heat sink panels. An additional sign feature 20, such as an LED backlit sign, is shown as incorporated into the overall system.

In summary, the illustrated embodiment is an improvement in LED lighting simulative of neon lighting is comprised of a light cable or fiber optic cable, a clamp coupled to the light cable for holding at least an end portion of the light cable in a predetermined bend, and an LED light source optically coupled to the light cable. The clamp holds the light cable in a bend with a radius at or greater than the minimum radius of bend permitted for the light cable. The clamp is coupled to a substrate for supporting the light cable above the substrate. A support is coupled to the clamp for supporting the light cable. The support includes a surface adjacent to the light cable to reflect light incident on the surface. The surface is a diffuse reflector. A clip retains the light cable onto the support. The clip is adapted to either restrain movement of the light cable with respect to the support in all directions or in only one direction. The clamp is adapted to bend the light cable through an angle of up to 90°, through an angle of more than 90° or up to 180°. The clamp is at least partially opaque and light shields an end portion of the light cable to simulate a neon tube. The clamp comprises two clamp halves and comprises a reinforcing flange to provide strength and assist in defining a radius of bend of the clamp. The LED light source comprises a housing to which the clamp is coupled, and comprises an LED emitter and a reflector. The clamp is mounted on a substrate and at least one additional sign element mounted to the substrate, such as an LED backlit sign element.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. An apparatus comprising:
   a light cable;
   a clamp coupled to the light cable for holding at least an end portion of the light cable in a predetermined bend; and
   a light source optically coupled to the light cable
   where the clamp comprises a reinforcing flange to provide strength and assist in defining a radius of bend of the clamp.

2. The improvement of claim 1 further comprising
   a substrate to which the clamp is mounted and at least one additional sign element mounted to the substrate.

3. The improvement of claim 2 where the at least one additional sign element comprises a backlight sign element.

4. The apparatus of claim 1 where the clamp holds the light cable in a bend with a radius equal to or greater than the minimum bend radius for the light cable.

5. The apparatus of claim 1 further comprising a substrate, the clamp coupled to the substrate for supporting the light cable above the substrate.

6. The apparatus of claim 1 further comprising a support coupled to the clamp for supporting the light cable.

7. The apparatus of claim 6 where the support includes a surface adjacent to the light cable to reflect light incident on the surface.

8. The apparatus of claim 7 where the surface is a diffuse reflector.

9. The apparatus of claim 6 further comprising a clip to retain the light cable onto the support.

10. The apparatus of claim 9 where the clip is adapted to restrain movement of the light cable with respect to the support in all directions.

11. The apparatus of claim 9 where the clip is adapted to restrain movement of the light cable with respect to the support in only one direction.

12. The apparatus of claim 1 where the clamp is adapted to bend the light cable through an angle of up to 90°.

13. The apparatus of claim 1 where the clamp is adapted to bend the light cable through an angle of more than 90°.

14. The apparatus of claim 1 where the clamp is adapted to bend the light cable through an angle of up to 180°.

15. The apparatus of claim 1 where the clamp is at least partially opaque and where the clamp shields an end portion of the light cable.

16. The apparatus of claim 1 where the clamp comprises two clamp halves.

17. The apparatus of claim 1 where the light source comprises a housing to which the clamp is coupled.

18. The apparatus of claim 1 where the light source comprises an LED emitter and a reflector.

* * * * *